(12) United States Patent
Gopalakrishna et al.

(10) Patent No.: US 12,531,731 B2
(45) Date of Patent: Jan. 20, 2026

(54) ENCRYPTION KEY ROTATION BASED ON DATASET SIZE OR TIME BETWEEN KEY ROTATION INTERVALS

(71) Applicant: Dell Products L.P., Round Rock, TX (US)

(72) Inventors: Madhu Agrahara Gopalakrishna, Fremont, CA (US); Mahadev Karadigudda, San Jose, CA (US); Sankalp Suhas Taralekar, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 493 days.

(21) Appl. No.: 17/575,439

(22) Filed: Jan. 13, 2022

(65) Prior Publication Data

US 2023/0224154 A1  Jul. 13, 2023

(51) Int. Cl.
*H04L 9/08* (2006.01)
*H04L 67/1097* (2022.01)

(52) U.S. Cl.
CPC .......... *H04L 9/0891* (2013.01); *H04L 9/0825* (2013.01); *H04L 9/088* (2013.01); *H04L 9/0894* (2013.01); *H04L 67/1097* (2013.01)

(58) Field of Classification Search
CPC ..... H04L 9/0825; H04L 9/0891; H04L 9/088; H04L 9/0894
See application file for complete search history.

(56) References Cited

U.S. PATENT DOCUMENTS

| | | | |
|---|---|---|---|
| 6,091,820 A * | 7/2000 | Aziz | H04L 9/40 380/30 |
| 8,284,945 B2 * | 10/2012 | Breyel | H04L 9/0891 380/284 |
| 9,172,532 B1 * | 10/2015 | Fuller | H04L 9/0822 |
| 9,251,097 B1 * | 2/2016 | Kumar | G06F 11/1076 |
| 9,300,464 B1 * | 3/2016 | Roth | H04L 9/0891 |
| 9,407,437 B1 * | 8/2016 | Campagna | H04L 9/16 |
| 9,722,974 B1 * | 8/2017 | Fuller | H04L 9/0836 |
| 9,853,811 B1 * | 12/2017 | Levy | H04L 9/088 |
| 9,882,720 B1 * | 1/2018 | Levy | H04L 63/123 |
| 10,073,855 B2 | 9/2018 | Chao | |
| 10,523,434 B1 * | 12/2019 | Sharifi Mehr | H04L 9/0891 |
| 10,931,450 B1 * | 2/2021 | Chellappa | H04L 63/068 |
| 12,290,339 B2 * | 5/2025 | Russek-Sobol | A61B 5/681 |

(Continued)

*Primary Examiner* — David Garcia Cervetti
(74) *Attorney, Agent, or Firm* — Staniford Tomita LLP (57) ABSTRACT

Embodiments for rotating encryption keys in a sized-based process by defining a threshold value specifying a maximum amount of data to be encrypted by a single encryption key, determining whether or not data currently ingested by the data storage system exceeds the threshold value, and performing a key rotation operation to use a new key to encrypt incoming future data if it does exceed the threshold value. A time-based process performs key rotation from an old key to a new key in accordance with a periodic schedule, determines if the key rotation operation is successful in rotating to the new key from the old key, and if the key rotation operation is successful then performing a subsequent key rotation operation in accordance with the periodic schedule, or if not successful sending a user alert and automatically re-attempting the key rotation operation.

12 Claims, 7 Drawing Sheets

(56) References Cited

U.S. PATENT DOCUMENTS

| | | | |
|---|---|---|---|
| 2006/0291664 A1* | 12/2006 | Suarez | H04L 9/3263 |
| | | | 380/286 |
| 2011/0191594 A1* | 8/2011 | Bartlett | G06F 11/2056 |
| | | | 713/189 |
| 2015/0180656 A1 | 6/2015 | Rich | |
| 2016/0050272 A1* | 2/2016 | Raduchel | H04L 67/1095 |
| | | | 709/204 |
| 2016/0154963 A1* | 6/2016 | Kumar | G06F 21/602 |
| | | | 713/189 |
| 2017/0034141 A1* | 2/2017 | Oberheide | H04L 9/30 |
| 2017/0285978 A1* | 10/2017 | Manasse | G06F 21/86 |
| 2018/0063103 A1* | 3/2018 | Jahid | H04L 63/0807 |
| 2018/0150412 A1* | 5/2018 | Manasse | G06F 21/62 |
| 2019/0147170 A1* | 5/2019 | Keselman | G06F 21/602 |
| | | | 713/189 |
| 2019/0149320 A1* | 5/2019 | Keselman | H04L 9/0891 |
| | | | 380/279 |
| 2020/0213108 A1* | 7/2020 | Roth | H04L 63/065 |
| 2020/0244445 A1* | 7/2020 | Ponnusamy | G06F 21/575 |
| 2021/0218548 A1* | 7/2021 | Abraham | H04L 63/0428 |
| 2021/0232459 A1* | 7/2021 | Katiyar | G06F 16/128 |
| 2021/0351924 A1* | 11/2021 | Luykx | H04L 9/088 |
| 2022/0069981 A1* | 3/2022 | Jog | H04L 9/088 |
| 2022/0180000 A1* | 6/2022 | Sofia | G06F 21/53 |
| 2022/0200800 A1* | 6/2022 | Xu | H04L 9/088 |

\* cited by examiner

| TABLE ENTRY | DATA ELEMENT |
|---|---|
| 1 | Encryption Key Information |
| 2 | Encryption Algorithm |
| 3 | Current Key State |
| 4 | Source Key Manager |
| 5 | Beginning Container ID |
| 6 | Ending Container ID |
| 7 | Deleted Container Count |

FIG. 7

Update/Add Starting Container ID for a New/Rotated Key and Use this Current Key to Encrypt Subsequent Containers
802

On Key Rotation, Stop Current Key Use and Switch to New Key
804

Update the Ending Container ID for the Old Current Key
806

Calculate Total Number of Containers Encrypted with the Current Key Starting Container ID to Ending Container ID
808

Track Number of Deleted Containers for a Key and add to Key Table for the Key Until Deleted Number Equals Total Number
810

Mark Keys with No Data for Destruction and Removal by Garbage Collection
812

ENCRYPTION KEY ROTATION BASED ON DATASET SIZE OR TIME BETWEEN KEY ROTATION INTERVALS

TECHNICAL FIELD

Embodiments relate generally to data encryption, and more particularly to encryption key management for data storage systems and improved methods of key rotation.

BACKGROUND OF THE INVENTION

With the increasing need to secure data access in data storage systems, it is necessary to ensure that data is secure throughout its lifecycle from on-disk storage to in-memory access. Current key-based encryption systems encode the data such that it can only be accessed or decrypted by a user with the correct encryption key. Key-based encryption can be symmetric where one secret key is used to both encode and decode the data, or asymmetric where encryption key is done using a public key and decryption is done using a private key. The longer that a particular key is in use, the more susceptible it is to compromise due to hacking, inadvertent disclosure, or other similar causes.

While encrypting data at rest, a storage system can get encryption keys from one of the several supported key managers. For security reasons, users rotate periodically rotate these encryption keys periodically. Users are typically provided options to automatically rotate keys periodically by setting up a key rotation policy. For example, rotation periods can be set to weekly or monthly key rotation and the assumption is that keys will be rotated at that frequency. To ensure consistent security, it is important for storage systems rotate its encryption keys at the defined key rotation interval. If keys are not rotated with sufficient frequency, a large amount of data may be forced to be encrypted using a single key, instead of having fractions of that data encrypted with different respective keys. This exposes the large amount of data to security vulnerabilities if that single key is compromised.

Whenever key rotation operation fails, the storage system needs to retry key rotation automatically from that failure time. If this does not happen, then for every such failure, key rotation stops unless users set the key rotation policy again. In many cases, users may not notice that key rotation has stopped working, and without the keys being rotated, the storage system will end up encrypting large amounts of data with a single key.

What is needed, therefore, is a key rotation mechanism that automatically retries rotation in the event of key rotation failure.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of Dell EMC Corporation.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments of a key management system perform size-based key rotation so that each key will encrypt equal amounts of data so that the keys control only limited amounts of data to help facilitate re-encryption of the data in case of key compromise/destroy events. Embodiments also retry time-based key rotation, rather than simply fail to rotate keys. Embodiments further automatically clean up encryption keys when no data is associated with that key in order to help the storage system avoid managing keys which are not needed. Such embodiments improve security of the overall storage system in case of key compromise/destroy events as limited amounts of data are encrypted using a single key.

Figure 1:
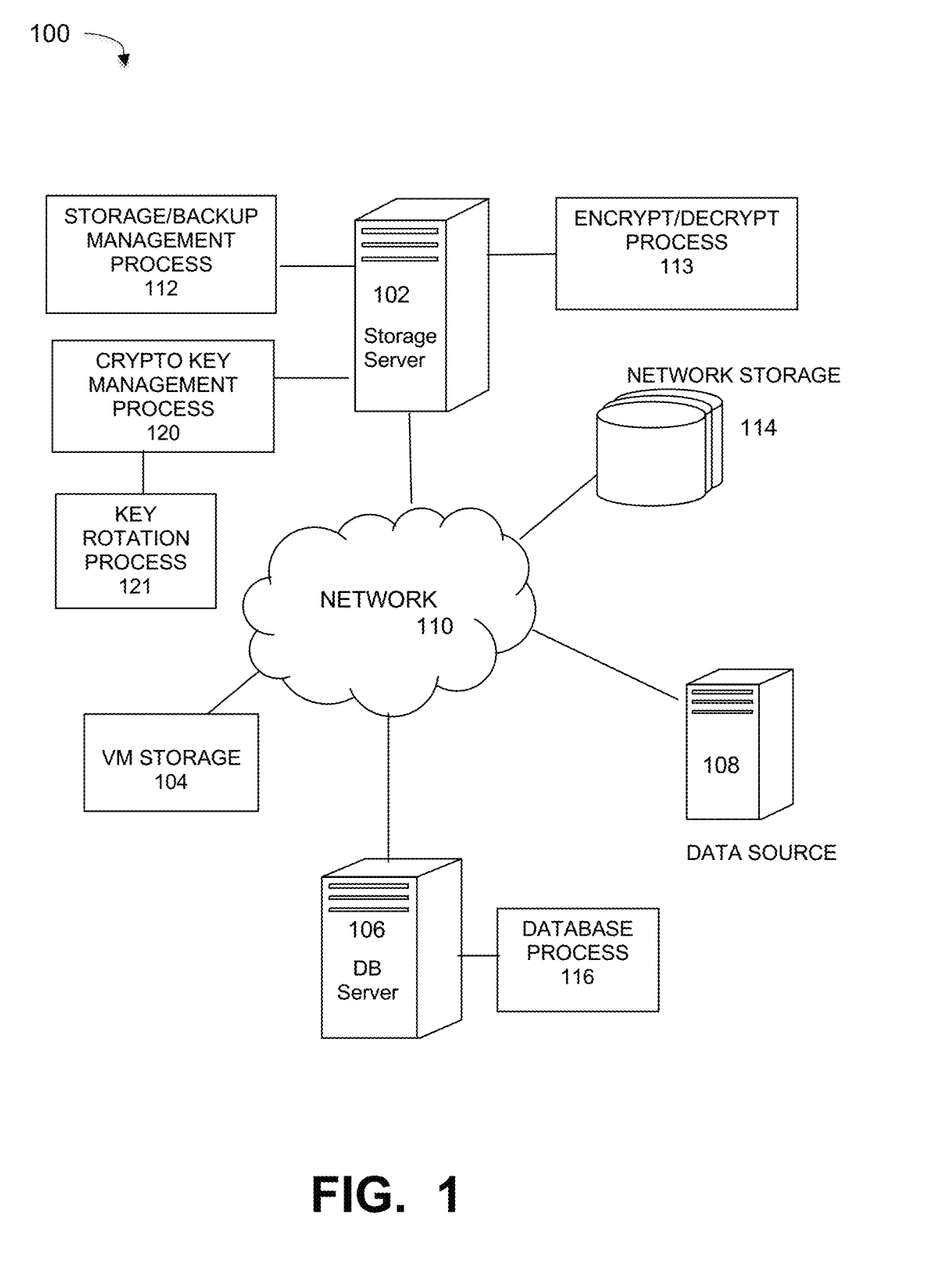
FIG. 1 is a diagram of a computing network implementing a key rotation mechanism, under some embodiments.

FIG. 1 illustrates a networked data storage system that implements one or more embodiments of a key management process implementing improved encryption key rotation, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

Data Domain is an example of a purpose-built backup appliance providing streaming deduplication that is able to ingest data at full network speeds, from multiple backup sources while providing storage efficiency.

Encryption keys used for encrypting data at rest are rotated at cadence to ensure that large amounts of data are not dependent on a single encryption key, which creates the risk of a single point of failure when securing data at rest. Data encryption key management system 100 is handled by a dedicated cryptographic key management module 120 that ensures that key rotation is handled seamlessly with ongoing data ingest and restore operations.

In an embodiment, the cryptographic key management system is used in a data storage system that implements a deduplication backup process, such as a Dell EMC Data Domain (DD) system. The Data Domain File System (DDFS) is an inline data deduplication file system. As data gets written to the file system, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

Systems such as DDFS may use the Key Management Interoperability Protocol (KMIP), which defines message formats for the manipulation of keys on a key management server. This facilitates data encryption by simplifying encryption key management. Keys may be created on a server and then retrieved. Both symmetric and asymmetric keys are supported, including the ability to sign certificates. KMIP also allows for clients to ask a server to encrypt or decrypt data, without needing direct access to the key. Under KMIP, each key has a cryptographic state. Keys are created in an initial state, d must be activated before: they can be used. Keys may then be deactivated and eventually destroyed. A key may also be marked being compromised.

A key can become compromised due to a variety of reasons or acts. For example, a compromised key can result from the unauthorized disclosure of a key so that all data encrypted by that key could be accessed by unauthorized parties. The integrity of a key could be compromised by invalid modification or substitution so that the key could be used for the wrong purpose or for the wrong application. The key's association with the owner could be compromised so that the identity of the other party cannot be assured or the data cannot be properly decrypted. Finally, the key's association with other information can be compromised so that the key is not associated with any data or the wrong data.

As stated above, it is necessary to rotate keys frequently to prevent an excess amount of data being encrypted by a single key. For example, with successful key rotations, 100 TB of data may be encrypted in chunks of 10 TB each with a different respective encryption key, whereas in the case of key rotation failure, all 100 TB may be encrypted with only one key, thus exposing the entire dataset to vulnerability rather than just one 10 TB chunk.

If a key gets compromised, the user must re-encrypt all the data associated with that compromised key. If a large amount of data (e.g., 100 TB versus 10 TB) is associated with a single compromised key, a great deal more time will be required to re-encrypt the data. The chance of security vulnerability increases in case of such a delay in re-encrypting that data, which may lead to disruptions in regular backup and restore operations. Therefore, defining and adhering to an effective key rotation policy is of great importance. Failing to rotate keys in case of failure and not re-trying the rotation at a later point in time can be a problem as it ends up encrypting larger amounts of data with a single key.

Figure 2:
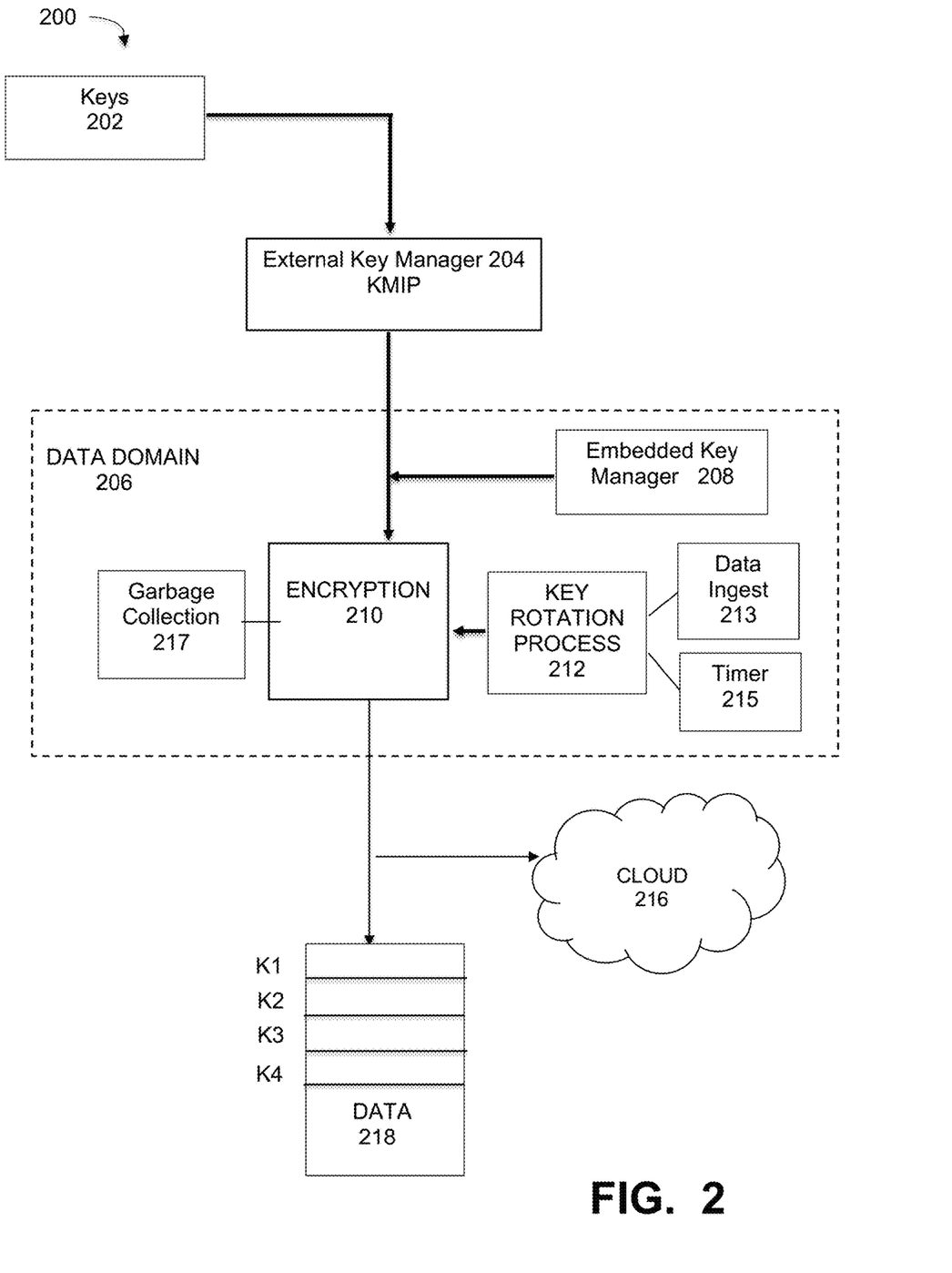
FIG. 2 illustrates the use of a key rotation process in conjunction with a Data Domain Deduplication system, under some embodiments.

2 illustrates the use of a key rotation process in conjunction with a Data Domain Deduplication system, under some embodiments. Although embodiments are described with respect to Data Domain and DDFS systems, it should be noted that any other similar deduplication backup system can be used. As shown in system 200, the Data Domain system 206 includes a key manager and encryption process 210 which encrypts data 218 using keys K1, K2, K3, K4, . . . , Kn. The keys used by the key manager can be sourced externally or internally. For example, keys 202 sourced externally can be sourced using a KMIP external key manager 204. Encryption keys are readily available from a number of key vendors, and most use the KMIP protocol, however, the external server housing the keys represents a point of vulnerability as a possible target for hackers and other system attacks. Some data storage systems utilize embedded or internal key sources. As shown in FIG. 2, internal keys can come from an internal key manager or source 208. Regardless of source, the keys are used for data encryption by the key manager 210. The encrypted data 218 can be stored in local (active tier) storage or it can be stored in the cloud 216.

As stated above, in the case of encrypted data, if any key compromise situation occurs, data encrypted with a compromised key must be re-encrypted to ensure the integrity of the data. If large amounts of data are encrypted by a single key, this re-encryption process can take a long time. This is especially true of data stored in the cloud 218. In this case, re-encrypted hundreds of TB of data in the cloud tier can take on the order of several weeks or even months.

Embodiments of system 200 include a key rotation process 212 that works with or is part of encryption process or subsystem 210. The key rotation process uses one or both of a size or time-based rotation policy that tries to ensure that each chunk of data encrypted by a key is the same or nearly the same size as the other encrypted chunks to prevent any one key from encrypting an excessive amount of data. Thus, as shown in FIG. 2, the data 218 encrypted as data chunks by each of keys K1, K2, K3, and K4 should be equal or at least approximately equal to each other.

Current systems generally use a scheduler process to periodically rotate their keys. One example is the cron command-line utility (cron job), which is a job scheduler on Unix-like operating systems that allows users to schedule jobs (commands or scripts) to run periodically at fixed times or intervals. Using a mechanism like cronjob, a user would define the rotation interval (e.g., once a day, once a week, etc.) through an appropriate parameter definition (e.g., crontab). The system then attempts to rotate the key at the specified interval, and if the rotation is a success, the next key rotation is performed at the time or date set in cronjob. However, if key rotation fails and the cronjob entry is not updated, then key rotation will simply stop happening form that time onwards. That is, at the time of automated key rotation failure, the key rotation process exits even when the next key rotation date is not successfully set. The previous key is used again continuously, thus leading to the potential problem of large amounts of data getting encrypted by a single key.

As shown in FIG. 1, and further described in FIG. 2, system 100 includes a key rotation process 121 that is part of or accessed by the key management process 120. This process ensures that key rotation is attempted at every key rotation interval, With that, the chances of encrypting a larger amount of data using a single key will be reduced. Embodiments of the key rotation process 121 (or 212) uses a size-based key rotation method, and improves current time-based key rotation methods to eliminate simply stopping key rotation if the rotation fails, by alerting the user and automatically retrying the key rotation after any failure.

Figure 3:
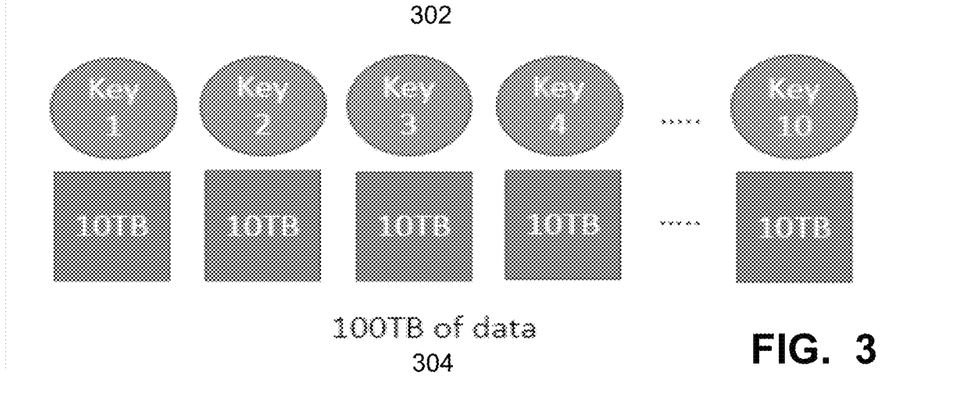
FIG. 3 illustrates a size-based encryption key rotation, under some embodiments.

FIG. 3 illustrates a size-based encryption key rotation, under some embodiments. As shown in FIG. 3, a 100 TB dataset 302 is to be encrypted by a number of keys. The dataset can be divided into chunks of any practical size, with each chunk encrypted by its own key. For the example of FIG. 3, the data 302 is divided into 10 chunks of 10 TB each, and each chunk is encrypted by a respective key 304 from key 1 to key 10. Any other appropriate division of the dataset 304 is also possible, such as quarters, fifths, and so on depending on system constraints and requirements.

Figure 4:
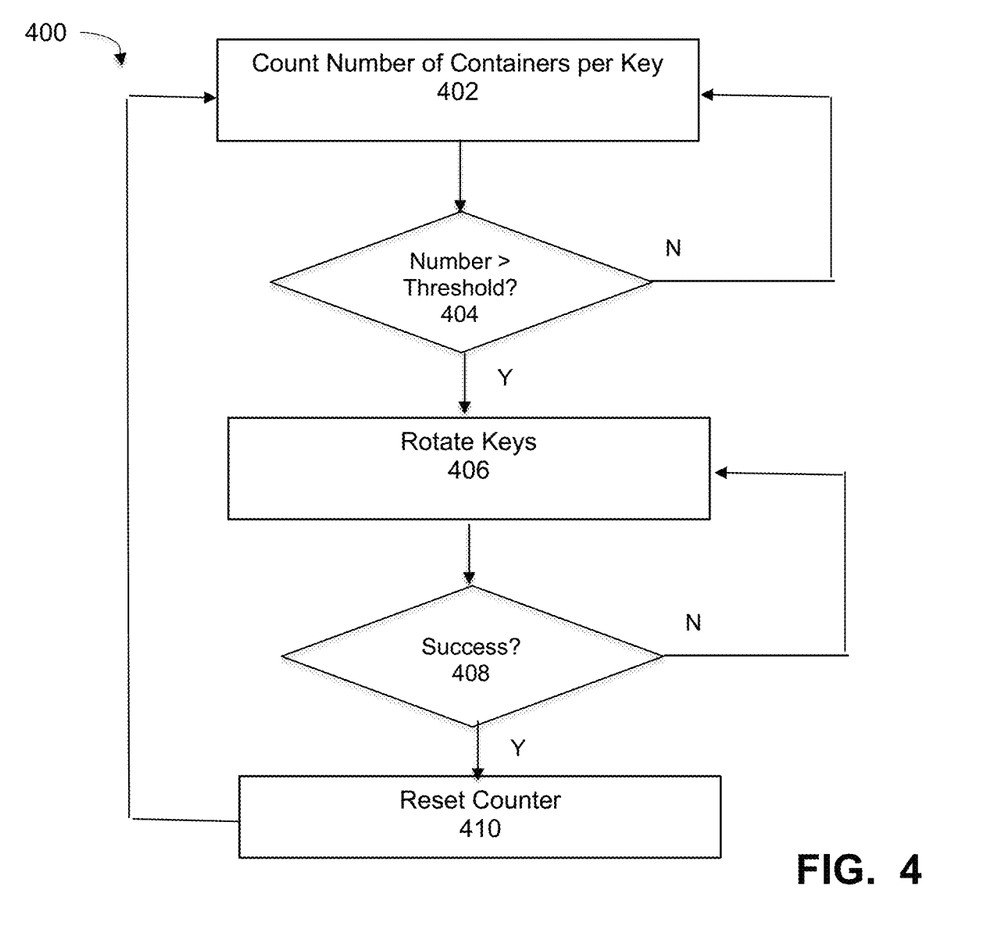
FIG. 4 is a flowchart illustrating a method of performing size-based key rotation, under some embodiments.

For the size-based key rotation, the key rotation process 212 utilizes or includes a data ingest counter 213 to keep track of the amount of data gathered into each chunk and assigned for encryption by a key. Any relevant measure of data I/O can be used, such as the number of containers per key. FIG. 4 is a flowchart illustrating a method of performing size-based key rotation, under some embodiments. Process 400 begins with the key rotation process counting the number of containers per key, 402, such as by using the data ingest measurement process 213. The system then determines if the amount of data exceeds a pre-defined threshold value, 404. This threshold representing the amount of data to be encrypted by a single key can be set to a strict value, or it can be selected and configured by a user. Typical values may be on the order of 5 TB or 10 TB per key, or any other appropriate amount of data.

When the amount of data (e.g., number of containers) exceeds the threshold, the key rotation process rotates the keys so that the next set of data is encrypted by a different key, 406. The system next determines if the key rotation was a success 408, and if not it attempts key rotation again, 406. With respect to determination of success or failure, based on the API response, system will determine if key rotation succeeded or failed. If the key rotation is successfully completed, the system then resets the counter and counts the number of containers for the next key.

As can be seen in FIG. 4, with size-based key rotation, when data with a particular key reaches a threshold, the process will trigger key rotation automatically. When supporting KMIP on the cloud tier, the system needs to support key compromised events in the cloud tier also. As stated above, if there is a large amount of data in cloud tier, then it takes lots of time to re-encrypt the data in case of key compromised event, which can be very costly. This method of key rotation is helpful for other large-scale data systems as well given that security is primary focus in today's vulnerable data world. Encrypting a lesser amount of data with each key helps to address the case when one or more individual keys get compromised. In this case, re-encrypting a lesser amount of data will be faster and security risks during the compromise period will be reduced.

The size-based encryption process involves using a counter 213 for the number of containers encrypted per key at the time of ingest, garbage collection and data movement. Whenever that counter reaches the threshold value, a key rotation request will be made to encryption subsystem. Then encryption subsystem 210 and key rotation process 212 will take care of rotating the key and also handles key rotation failure by retrying key rotation at a later time.

Another type of key rotation process is time-based key rotation with automatic re-try, which expands on current key rotation mechanisms. Whereas current systems simply stop key rotation in the case of rotation failure, embodiments of the key rotation process automatically updates the next key rotation time or date to the following rotation interval even in case of key creation failure. This process can also raise an alert to the user that key rotation has failed, so that a manual key rotation can be performed, if desired. In case a user misses seeing or responding to that alert, the key rotation will be tried automatically in the next key rotation interval. In this manner, key rotation will not stop at the first failure, as happens in current systems.

Figure 5:
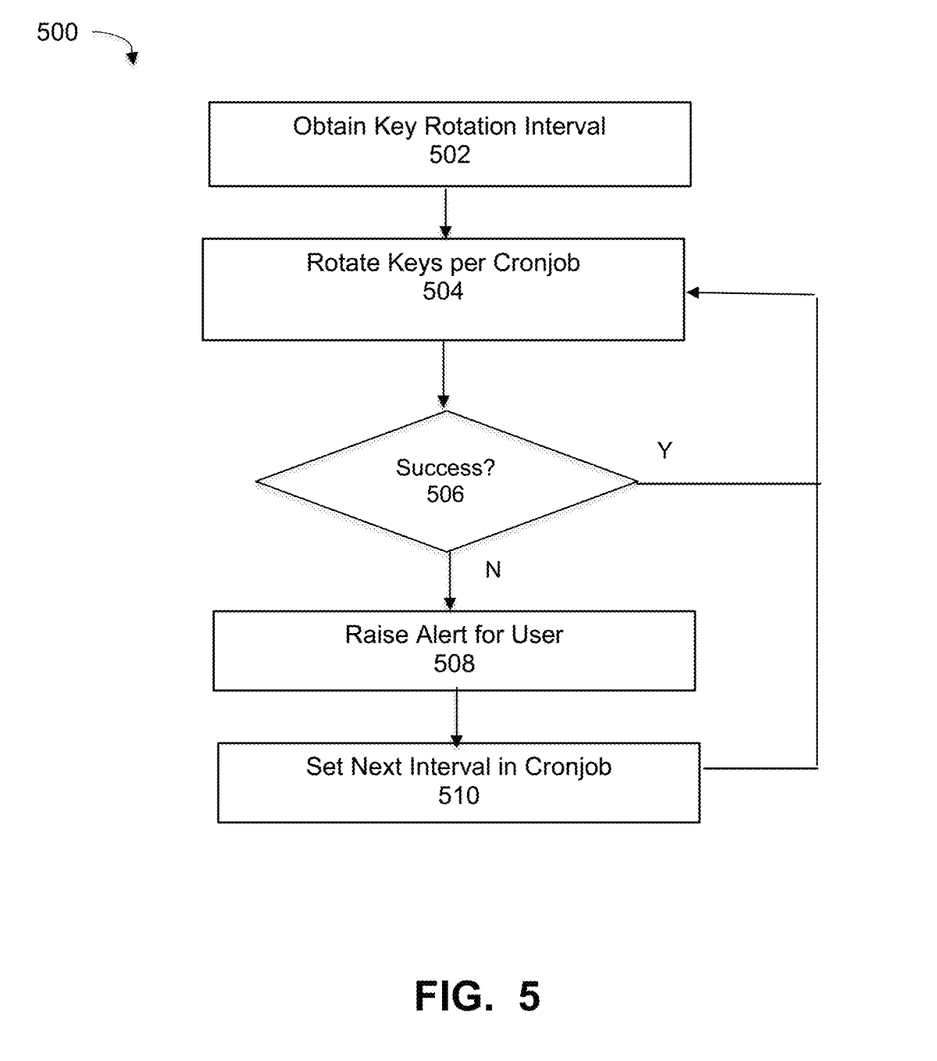
FIG. 5 is a flowchart illustrating a method of performing time-based key rotation, under some embodiments

The time-based key rotation process 212 utilizes an internal or external timer 215 to keep track of time between key rotations (rotation intervals). FIG. 5 is a flowchart illustrating a method of performing time-based key rotation, under some embodiments. As shown in FIG. 5, process 500 starts with the system obtaining the key rotation interval, such as through the Cronjob script, 502. The process then automatically rotates the keys upon the specified interval, 504. The system then determines whether or not the key rotation is a success, 506. If so, the next key rotation interval is automatically performed as defined in Cronjob, 504. If the key rotation is not a success, the system raises an alert for the user who can then manually force a key rotation, or take other remedial measures, 508. The system also sets the next key rotation interval in Cronjob, 510, so that the keys are then attempted to be automatically rotated at the next interval, 504.

FIG. 5 illustrates the significant changes and improvements to current key rotation systems by introducing an alert mechanism and automatic key rotation re-try where key rotation will be tried at the next interval. In some embodiments, the automatic re-try interval may be the same as the original interval 502, or it may be changed to a different (e.g., more frequent) interval. This automatic setting of the next key rotation interval and rotation re-try mechanism correctly ensures the periodic rotation of keys in the event of key rotation failures. In the case of multiple successive key failures and automatic re-try failures, the alert mechanism should provide adequate notice for the user to trigger a manual key rotation, thus providing a further level of key rotation backup.

Figure 6A:
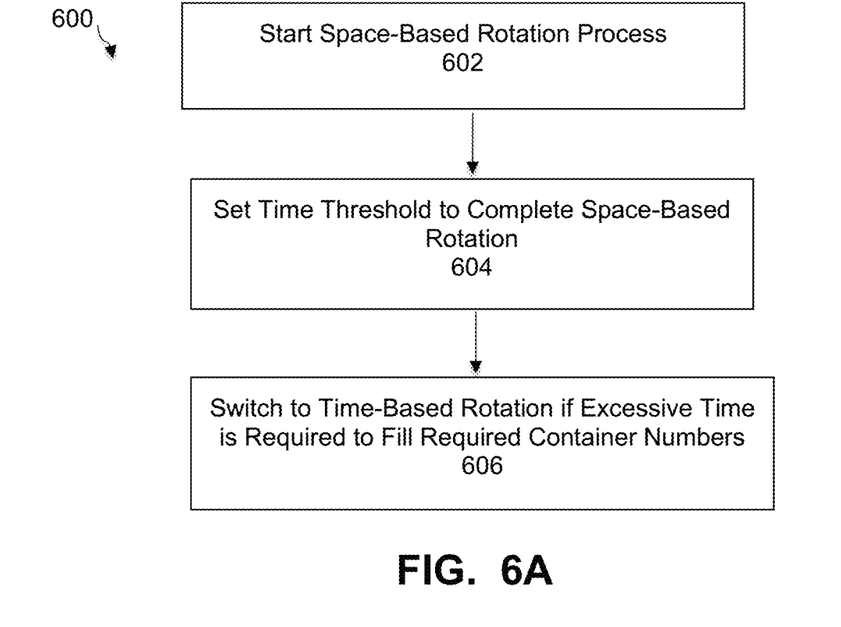
FIG. 6A is a flowchart illustrating a method of integrating time-based rotation with size-based rotation, under some embodiments.

In an embodiment, the key rotation process 212 implements either the size-based key rotation 400 or the time-based rotation 500. In another embodiment, the key rotation process 212 may implement both size and time-based key rotation in a nested rotation scheme. For example, if the size-based rotation starts by assigning keys regularly for incoming data, but then slows because of slow or suspended data ingestion, the process may switch to time-based key rotation to prevent the next rotation to wait too long for sufficient data to fill the current number of containers (chunk size). A size-based rotation process that may periodically hang up because of inconsistent or patchy container fill rates may introduce excessive time lags that the time-based rotation process can alleviate to reduce the vulnerabilities from using keys that are not rotated soon enough. This is illustrated in FIG. 6A, which is a flowchart showing a process of integrating time-based rotation with size-based rotation, under some embodiments. As shown in process 600, the system starts with size-based rotation using the defined data ingestion counter value, such as numbers of containers per encryption key. The system also monitors the amount of time required to meet the threshold number (such as by using timer 215), 604. If an excessive amount of time is required to meet the threshold for the next encryption key, the system will switch to time-based rotation, 606. For example, if the next 5 TB in a 10 TB chunk takes in excess of the usual or nominal rotation period of one-month, the system will go ahead and rotate the key for that 5 TB chunk to prevent waiting too long for the next 5 TB to arrive. Once the key is rotated using the time-based rotation, the system can revert to size-based rotation until the next excessively long period is encountered, or it may stay with time-based rotation until user reset.

Figure 6B:
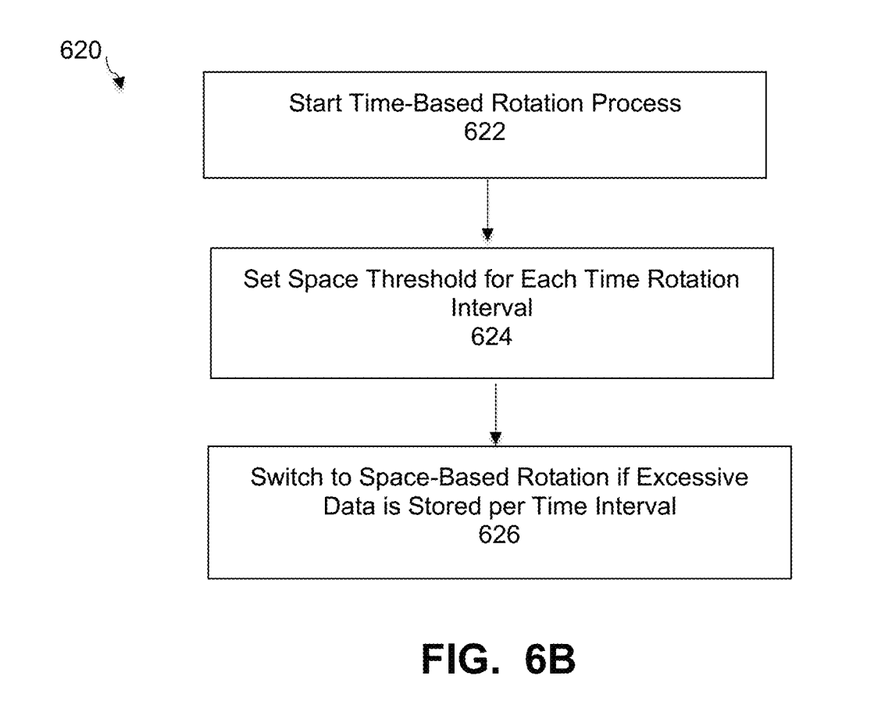
FIG. 6B is a flowchart illustrating a method of integrating size-based rotation with time-based rotation, under some embodiments.

Similarly, if the time-based system is used, and it is determined that data ingestion rates are so high that too many containers are filled per encryption key within each defined Cronjob interval, a size-based rotation process may be used to more quickly rotate keys so that not too much data is encrypted with a single key even though the rotation interval may not be reached. This is illustrated in FIG. 6B, which is a flowchart showing a process of integrating size-based rotation with time-based rotation, under some embodiments. As shown in process 620, the system starts with time-based rotation using the defined Cronjob value, or other parameter that sets the rotation interval. The system also monitors the data ingested within each time interval (such as by using data ingest counter 213), 624. If an excessive amount of data is ingested during a current interval, the system will switch to size-based rotation, 626. For example, a time interval is one-month, but it is determined that 10 TB has already been ingested in the first week of that month, the system will go ahead and rotate the key for that data chunk to prevent too much extra data being encrypted by that key during the rest of the interval (i.e., 3 weeks). Once the key is rotated using the size-based rotation, the system can revert to time-based rotation until the next excessive data ingestion, or it may stay with size-based rotation until user reset.

Garbage Collection

In general, there is a trade-off with the frequency of key rotation and the amount of data encrypted with each key. Keys must be rotated regularly to prevent time exposure to corruption or excessive data collection, but should not be used to encrypt only small amounts of data. With frequent or aggressive key rotation intervals, there may be many keys created in the system over a long period of time. Consequently, it may become difficult to maintain large number of keys and at some time there may be no place to create new keys.

An overly large key set takes longer time to sync with an external key manager such as KMIP, and storage overhead may be unduly burdened. In a deduplicating storage system (e.g., DDFS) based on liveness and other conditions, space reclamation often consolidates multiple containers on an on-going basis. At such time, all new containers are encrypted with latest key. Thus, the amount of data encrypted with older keys begins to progressively decrease. An encryption key is kept in the system as long as there is any data at all that is encrypted with that key. Keys can thus live for much longer than their rotation interval, and many old unused keys can remain in the key inventory. For example, a new key may encrypt 5 TB of data within the first half of its lifetime, and as it ages many of the data files will be deleted, resulting in a point in time where maybe only one or two files exist for that encryption key and once these files are deleted, the key is no longer needed.

As shown in FIG. 2, the Data Domain system 206 includes a garbage collection process 217 that reclaims space from unused data elements and system resources, such as encryption keys. Thus, if at some point, the deduplicating storage system detects that no existing data is encrypted with an old key, it can then initiate a self-delete operation on that key using this garbage collection process. This will result in automatically freeing up of unused key entries in the key table.

A standard data encryption key table used in current storage systems, such as DDFS, stores per-key information including: encryption key information, encryption algorithm, current state of the key, and source key manager.

Figure 7:
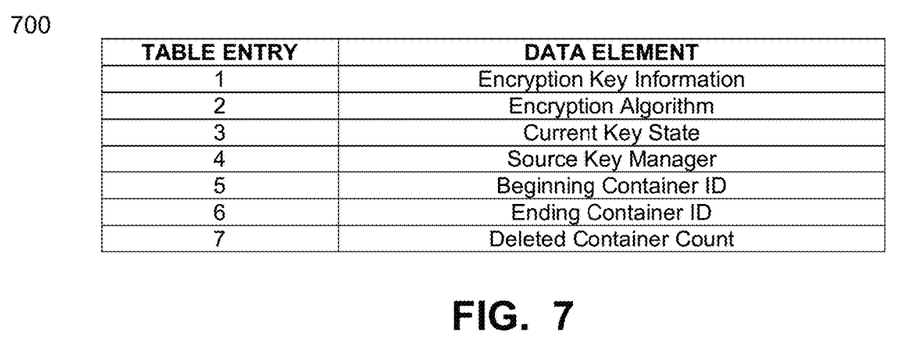
FIG. 7 is a table illustrating a key table used for garbage collection in a key rotation process, under some embodiments.

Under an embodiment, the key table is expanded to add additional per-key data structures for beginning and ending container IDs and a deleted container count to facilitate automatic garbage collection for unused keys. FIG. 7 is a table 700 illustrating a key table used for garbage collection in a key rotation process, under some embodiments. As shown in FIG. 7, the key table now includes encryption key information, encryption algorithm, current state of the key, source key manager, beginning container ID, ending container ID, and deleted container count.

Figure 8:
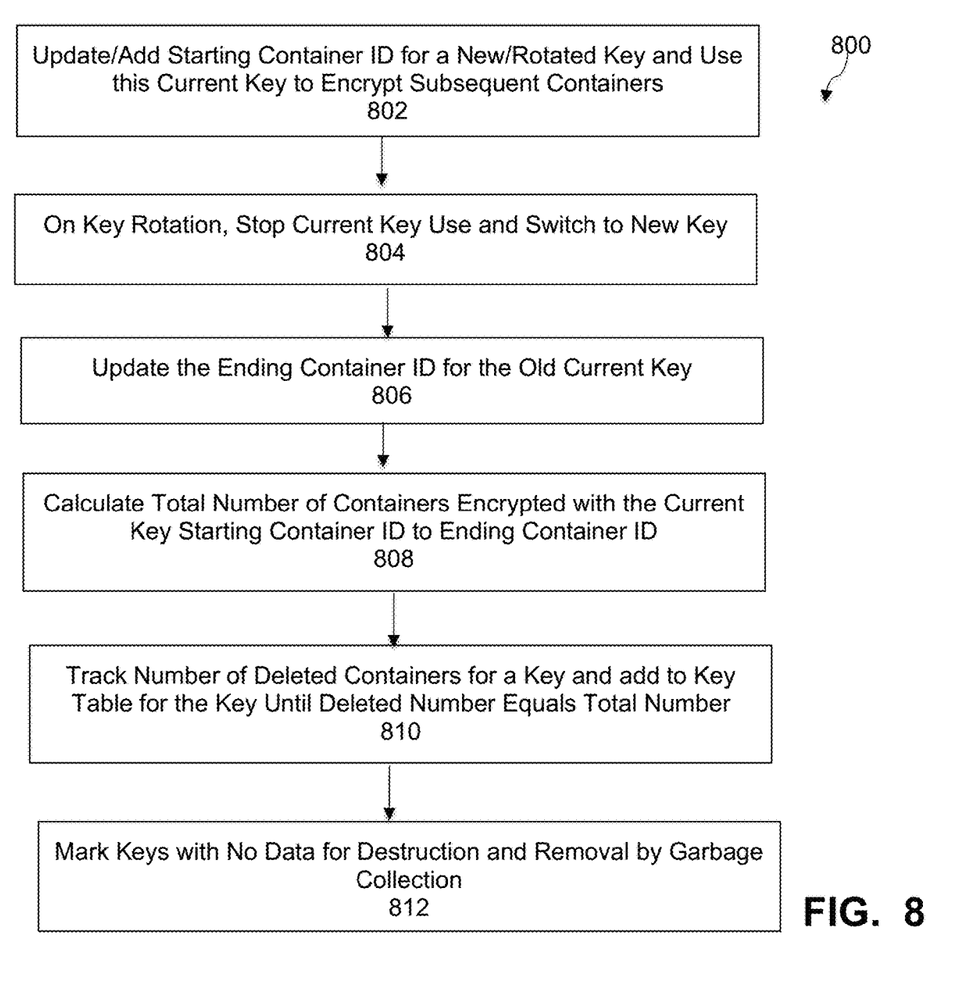
FIG. 8 is a flowchart that illustrates a method of garbage collection using the key table structure of FIG. 7, under some embodiments.

FIG. 8 is a flowchart 800 that illustrates a method of garbage collection using the key table structure of FIG. 7, under some embodiments. At the beginning of key rotation, the starting container ID will be added/updated in the per-key structure for a current key, and subsequent containers will be encrypted using this current key, 802. At the time of a next key rotation, storage system will stop encrypting new data with current key and will switch to the new key, 804. At this time, the ending container ID will be added/updated to the key table for that current key, 806. Hence, the number of containers encrypted with a key will be the difference between values held in these two data structures, and can be calculated as such, 808. In an embodiment, another per-key field indicating number of deleted containers within the above range is added to the key table, as shown in FIG. 7. When space reclamation activity such as garbage cleaning deletes containers for any reason, this "delete count" data structure is incremented, 810. Progressively, this count should go up and when it reaches the count of all containers encrypted with that key, there should no longer be any data left that was encrypted with that key.

Such a key with no data can be put in a destroyed state, which will allow the garbage collection process to do a second swipe. After every cycle of garbage collection, the filesystem will look at the keys that do not have any data associated with them. Those keys will be marked for destruction automatically, 810. A subsequent cycle of garbage collection will move that key state to destroyed and keys will be deleted automatically.

In an embodiment, fragmented space can be re-organized and re-encrypted to form a new data chunk encrypted using a new key. The old key for these fragments can be set to read-only, while the new key can be set to read/write or write only.

Embodiments of the processes and techniques described above can be implemented on any appropriate data storage or backup system operating environment or file system, or network server system. Such embodiments may include other or alternative data structures or definitions as needed or appropriate.

Figure 9:
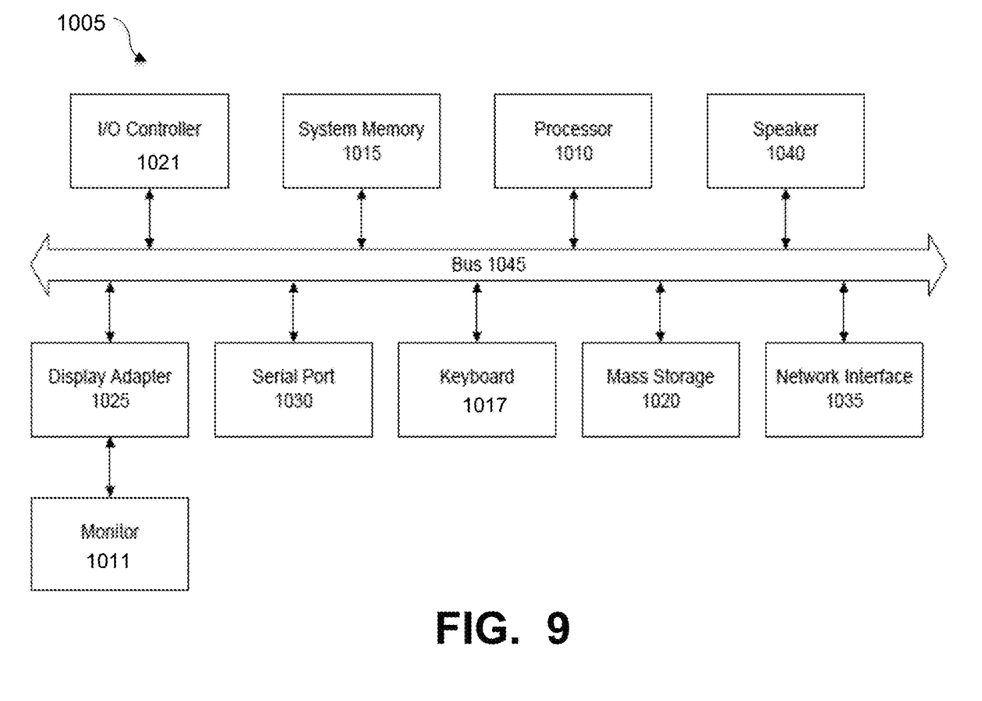
FIG. 9 is a system block diagram of a computer system used to execute one or more software components of the described systems and processes, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 9 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of rotating encryption keys in a data storage system using a nested rotation scheme, comprising:
    defining a threshold value specifying a maximum amount of data to be encrypted by a single encryption key;
    determining whether or not an amount of data currently ingested by the data storage system exceeds the threshold value;
    performing a first key rotation operation to use a new key to encrypt incoming future data if the amount of data currently ingested exceeds the threshold value to trigger a space-based rotation scheme;
    encrypting the incoming future data with the new key in a computerized encryption process for use by a deduplication backup process;
    determining if a rate of the encrypting of the incoming future data is suspended or slowed in order to trigger a time-based rotation scheme;
    tracking an amount of time comprising a measured time interval between key rotation from an old key to the new key;
    defining a maximum amount of time for the measured time interval;
    determining if the measured time interval exceeds the maximum amount of time;
    performing a second key rotation operation to the new key if the measured time interval exceeds the maximum amount of time even if the amount of data currently ingested by the data storage system does not exceed the threshold value; and
    reverting to the space-based rotation scheme if an excessive amount of time in excess of the maximum amount of time is required to perform the second key rotation operation.

2. The method of claim 1 wherein the amount of data comprises a number of containers storing data, and wherein the threshold value is on the order of 5 TB to 20 TB, the method further comprising:
    storing the new key and one or more old keys including the old key in a key table; and
    detecting that no existing data is encrypted with the old key and initiating a self-delete operation on the old key using a garbage collection process to automatically free up unused key entries in the key table.

3. The method of claim 2 wherein the determining step uses a counter to count the number of containers.

4. The method of claim 3 further comprising resetting the counter after the first key rotation operation.

5. The method of claim 4 further comprising determining if the first key rotation operation is successful in rotating to the new key from the old key.

6. The method of claim 5 further comprising automatically re-attempting the first key rotation operation if the first key rotation operation was not successful.

7. The method of claim 6 wherein the automatically re-attempted key rotation is performed as a next key rotation operation in accordance with a periodic schedule.

8. The method of claim 7 wherein the periodic schedule comprises a maximum time interval between key rotation operations, and is defined by a Cronjob operating script.

9. The method of claim 8 wherein per the maximum time interval is on the order of a number of days, a number of weeks, or a number of months.

10. The method of claim 2 wherein the encryption key is provided to a key manager component accessing the key table, by one of an external key source utilizing a Key Management Interoperability Protocol (KMIP) or an embedded key source within the data storage system.

11. The method of claim 10 wherein the data storage system comprises part of the deduplication backup process executed by a data storage server running a Data Domain file system (DDFS).

12. The method of claim 1 further comprising raising an alert to a user if any key operation is not successful to facilitate user initiation of a manual key rotation operation.

* * * * *